Dec. 13, 1966     S. E. PETERSON     3,291,176

SEED POTATO CUTTER

Filed March 27, 1964

*INVENTOR.*
SOREN E. PETERSON
BY *M. Ralph Shaffer*
HIS ATTORNEY

United States Patent Office 3,291,176
Patented Dec. 13, 1966

3,291,176
SEED POTATO CUTTER
Soren Eskel Peterson, 1649 West 33rd South,
Salt Lake City, Utah
Filed Mar. 27, 1964, Ser. No. 355,386
4 Claims. (Cl. 146—164)

The present invention relates to potato seed cutting machines and, more particularly, to a new and improved cutting machine wherein the conveyor means is provided with means for directing and controlling the downward and outward flow of potatoes preparatory to their being cut into seed.

Accordingly, a principal object of the present invention is to provide a new and improved potato seed cutting machine.

A further object of the invention is to provide an improvement in potato seed cutting machines wherein desired potato orientation can be achieved during a conveying process and retained once conveyance is about to be completed, this by the provision of plural conveyor bands uniquely cooperating with the roller type conveyance means.

A further object of the invention is to provide a novel conveyor means for potato seed cutting machines wherein oppositely revolving, conveyor rollers and cutting means associated therewith are provided with proximately oriented conveyor bands which direct potatoes to be cut into the output pressure rollers and cutting means associated therewith in the most desired manner.

The features of the present invention which are believed to be novel are set forth with particularity in the appended claims. The present invention, both as to its organization and manner of operation, together with further objects and advantages thereof, may best be understood by reference to the following description taken in connection with the accompanying drawings wherein:

Figure 1:
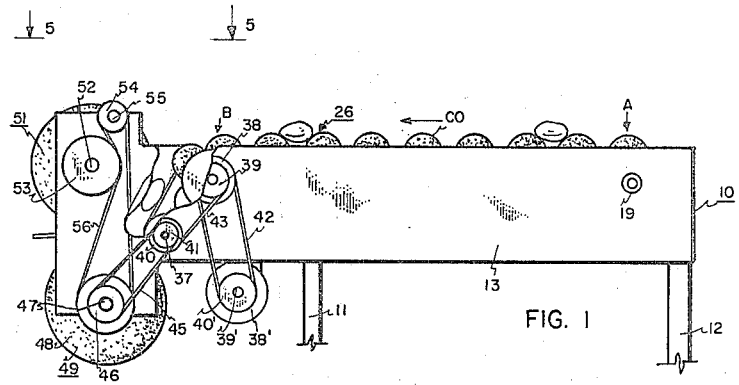
FIGURE 1 is a fragmentary side elevation, partially broken away for convenience of illustration, of a potato seed cutting machine incorporating the features of the present invention.

In FIGURE 1 the potato seed cutting machine 10 includes conventional legs 11 and 12 on both sides thereof and sides 13 and 14. Disposed interiorly of both sides 13 and 14 of the machine, are sprockets 15 and 16, the same being journaled to sides 13 and 14 by means of sprocket shafts 17 and 18 and plural bearings 19 one of which is shown, see FIGURE 1. The sprockets 15 and 16 will, of course, be keyed to their respective shafts 17 and 18. A pair of elongate endless means such as sprocket chains 20 encompass and engage the sprocket pairs 15, 16, see FIGURE 2, in a conventional manner. Each of the sprocket chains 20 receives at mutually spaced pin apertures 21 the shouldered end 22 of respective roller means shaft 23, the latter including respective end apertures 24 for receiving cotter keys 25. In addition to including the shafts 17, 18, sprockets 15, 16 and endless sprocket chains 20, the conveyor means 26 includes the plural, mutually spaced roller shafts 23 and, mounted thereupon, respectively, plural rollers 27 each of which are provided with peripheral, downwardly-tapered edges 28 and 29 to form individual pockets 30. The pockets 30 are for receiving and centering respective potatoes 31 for proper cutting, see FIGURE 5. It will be seen with reference to FIGURE 5 that in fact the pockets are formed not only by adjacent rollers 27 on the same roller shaft, but actually by these and the pair of rollers disposed on the shaft immediately adjacent thereto, see FIGURE 5. Each of the rollers 27 is designed for actual rotation thereon as the rollers proceed along and over the friction plate 32, disposed intermediate the sides 13 and 14 of the cutting machine. This rolling action of the individual rollers 27 tends to orient the potatoes such that their longitudinal axes are transverse to the machine, see FIGURE 5.

Of immediate importance in the invention is the provision of plural straps or belts 35 which are endless in character and are disposed exterior of and engage the individual shafts 23 of the conveyor means 26. These plural belts may be formed of webbing, nylon or rubber or other resilient band means, and so forth.

Figure 2:
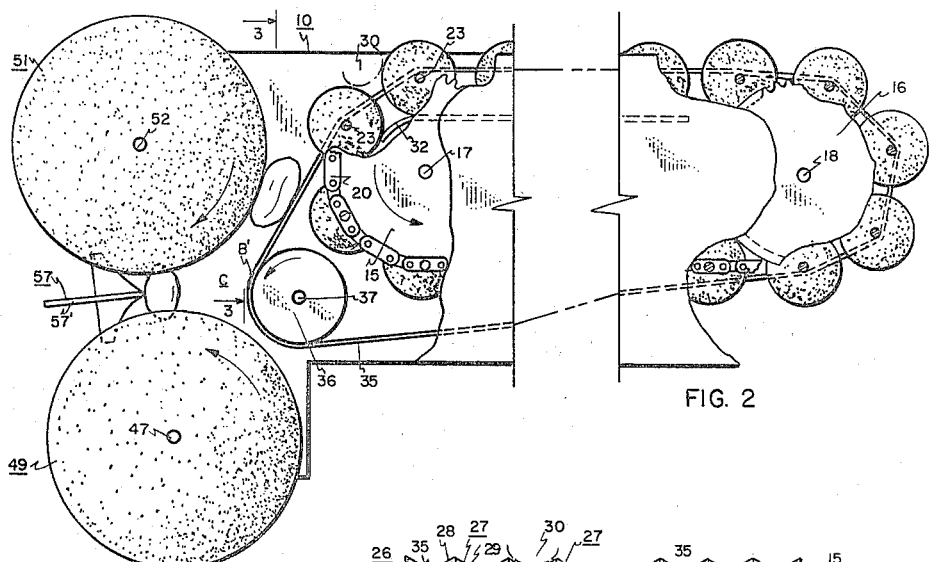
FIGURE 2 is an enlarged side elevation, fragmentary in nature, principally of the forward portion of the invention shown in FIGURE 1 with the outermost side plate shown removed.
Figure 4:
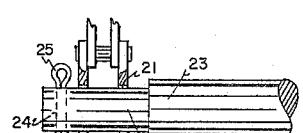
FIGURE 4 is an enlarged detail of a representative end of a conveyor roller means and is taken along the arcuate line 4—4 in FIGURE 3.

These endless members, in addition to engaging the individual shafts 23, spacedly encompass the additionally supplied driven roller 36 which, as shown, rotates in a counterclockwise direction, see FIGURE 2. Roller 36 is pinned to shaft 37, and the latter is journaled to sides 13 and 14 by appropriate bearing means, not shown. Pulleys 38 and 39 are pinned to sprocket shaft 17, see FIGURE 3, and pulleys 40 and 41 are pinned to shaft 37. Thus, motor 38' in FIGURE 1 includes output shaft 39' and output pulley 40' keyed thereto, and an endless belt 42 intercouples pulley 40 with pulley 38, see FIGURES 1 and 3. This motor drive is utilized through the intercooperation of pulleys 39 and 40 and a provided belt 43. Pulley 41, in turn, is coupled by belt 45 to pulley 46, keyed to shaft 47. Shaft 47 also receives and pins pulley 48, and additionally, output roller means 49 comprising plural rollers 50. These rollers are rigidly affixed to shaft 47 by any one of several conventional means.

Correspondingly, output roller means 51 is provided with shaft 52 affixed thereto and which keys pulley 53. An idler pulley 54 is journaled to side plate 13. Accordingly, an endless belt 56 engages, as shown, the pulleys 53, 48 and 54 to supply power to oppositely revolving pressure roller means 49 and 51, as indicated. A suitable cutting knife 57, see the applicant's co-pending case, entitled "Machine for Cutting Potatoes into Potato Seed," Serial No. 284,909, now Patent No. 3,195,597, is fixedly disposed between output roller means 49 and 51, and is designed for cutting the potatoes which proceed through the rollers 49 and 51, the latter revolving as indicated in FIGURE 2.

The construction and spacing of output roller means 49 and 51 together with the positioning of roller 36, will be such that potatoes advancing from pockets 30 will ride along band-like members 35 to the approximate position of the outer periphery point B', of roller 36. At this juncture both of the output roller means 49 and 51 cooperate to further advance the potatoes through the cutting means 57 to cut the potatoes in a desired number of seed.

The structure thus far described operates as follows. By any one of several types of means, or simply manual placement, potatoes are deposited onto the originating end A of the conveyor means 26 of the potato seed cutting machine. Motor 38 advances such as to rotate sprocket 15 in a counterclockwise direction, see FIGURE 2. The potatoes in being deposited upon the conveyor means 26 tend to orient themselves in accordance with the progression of conveyor means 26 along its upper travel course CO so as to align themselves transversely, with respect to the machine, see FIGURE 5, in each of the pockets 30 formed by four mutually adjacent rollers 27. This alignment is facilitated where the rollers along their upper leftward traveling course ride over roller revolution-producing plate 32, see FIGURE 2. Hence, by the time the potatoes reach the forward end B of the conveyor run the potatoes will be aligned as indicated at 31 in FIGURE 5 so as to be adapted for proper transport downwardly by the conveyor means 26, and the rollers 27, to conveyor straps 35. Pulley and roller sizes and dispositions and respective operating speeds may be so selected that output roller means 51 engage the potatoes just as they are released from pockets 30 and deposited onto straps 35, with the peripheral speed of straps 35 being approximately equivalent to or slightly less than, or greater than that of roller means 51, for potato rotative advancement purposes. As seen, the conveyor straps proceed about roller 36 which is a driven roller. This driven roller advances the straps and the potatoes advance to a position C, see FIGURE 2, at which point the output roller means 4, 9, 51 in FIGURE 1, preferably made of sponge rubber, grasp the potatoes and roll them through the cutting means 57. Roller sizes may be so selected, together with pulley sizes, speeds and so forth, so that the potatoes may be advanced a desired degree (e.g. a quarter turn) in order that the longitudinal knife portion 57 of knife 56 cuts through the minor axis of the transverse cross-section of the potato. The straps assure that pocket alignment of the potatoes, as they proceed along the conveyor means 26, is not lost when the potatoes are transported downwardly by the equipment to the proximity of the cutting blade 57.

Figure 3:
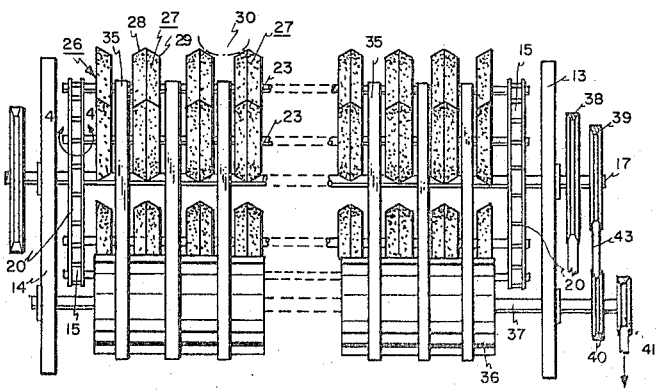
FIGURE 3 is an enlarged front elevation of the conveyance portion of the structure taken along the line 3—3 in FIGURE 2.
Figure 5:
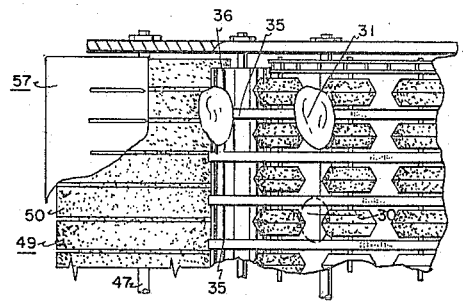
FIGURE 5 is a fragmentary top plan of the forward end of the potato seed cutting machine of the present invention and is taken along the line 5—5 in FIGURE 1.

It will be noted with reference to FIGURE 3 that the conveyor bands 35 come into operation only at the forward end B of the conveyor means wherein the potatoes are deposited from their respective pockets 30 onto the bands. These bands will be sufficiently closely spaced so that potatoes will not drop therebetween. Suitable spacing will be about three to five inches. The output conveyor rollers 51 and 49 are preferably made of sponge rubber and this preferably of plural rollers as indicated in FIGURE 5. The roller 36 may be made of somewhat harder materials, such as regular rubber, if desired; however, sponge rubber may serve equally as well. The conveyor rollers 27 are likewise formed of a soft rubber material.

While particular embodiments of the present invention have been shown and described, it will be obvious to those skilled in the art that changes and modifications may be made without departing from this invention in its broader aspects, and therefore, the aim in the appended claims is to cover all such changes and modifications as fall in the true spirit and scope of the invention.

I claim:

1. A potato seed cutting machine including, in combination, a conveyor having an operable upper course of travel and a forward end and including a pair of parallel, vertically oriented, horizontally spaced endless means, plural, parallel shafts disposed between and secured to said endless means in mutually spaced relationship, plural sets of revolvable roller means respectively disposed on each of said plural shafts and dimensioned to form individual potato receiving pockets between adjacent ones of said shafts, each of said sets of roller means comprising respectively aligned, plural, spaced rollers, means for revolvably constraining said endless means to mutually corresponding, operable, looped configurations, means for frictionally revolving said sets of roller means as they proceed forwardly along the conveyor's upper course of travel, means for driving said endless means, a driven roller, means coupled to said driven roller for driving said driven roller, said driven roller being disposed parallel to said shafts and beneath said upper course of said conveyor means, and mutually spaced, plural conveyor strap means looped around said conveyor means, interposed between adjacent rollers of each of said sets of roller means, and engaging and disposed over said parallel shafts and said driven roller for advancing potatoes in a downwardly and forwardly course of travel; cutting means disposed proximate said conveyor forward end, oppositely revolving, resilient, output pressure roller means constructed and arranged for receiving potatoes from said strap means and feeding them through said cutting means, and drive means for so oppositely revolving said pressure roller means.

2. Structure according to claim 1 wherein the uppermost one of said output roller means is so constructed and arranged with respect to said conveyor as to engage potatoes deposited onto said conveyor when said potatoes are deposited onto said conveyor strap means, for conveying with said conveyor strap means said potatoes to the remaining output roller means, for subsequent routing through said cutting means.

3. Structure according to claim 2 wherein said output roller means and said conveyor are constructed and arranged such that, when said machine is operating, the peripheral speed of said output roller means is different from the travel speed of said conveyor strap means.

4. A potato seed cutting machine including, in combination, a conveyor having an operable upper course of travel and a forward end and including a pair of parallel, vertically oriented, horizontally spaced endless chains, plural parallel shafts disposed between and secured to said endless means in mutually spaced relationship, plural sets of revolvable roller means respectively disposed on each of said plural shafts and dimensioned to form individual potato receiving pockets between adjacent ones of said shafts, each of said sets of roller means comprising respectively aligned, plural, spaced rollers, sprocket means for constraining said endless means to mutually corresponding, operable, looped configurations, means for frictionally revolving said sets of roller means as they proceed forwardly along the conveyor's upper course of travel, means for driving said sprocket means, a driven roller, means coupled to said driven roller for driving said driven roller, said driven roller being disposed parallel to said shafts and beneath said forward end of said conveyor, and mutually spaced, plural conveyor strap means looped around said conveyor means, linearly interposed between adjacent rollers of each of said sets of roller means, and engaging and disposed over said parallel shafts and said driven roller for advancing potatoes in a downward and forward course of travel; cutting means disposed proximate said conveyor forward end, oppositely revolving, resilient, pressure roller means constructed and arranged for receiving potatoes from said strap means and feeding them through said cutting means, and drive means for so oppositely revolving said pressure roller means.

References Cited by the Examiner

UNITED STATES PATENTS 3,096,801  7/1963  Miles et al. _____ 146—57 X
3,179,138  4/1965  Norris _____ 146—163 X ROBERT C. RIORDON, *Primary Examiner.*

W. GRAYDON ABERCROMBIE, *Assistant Examiner.*